Patented June 1, 1943

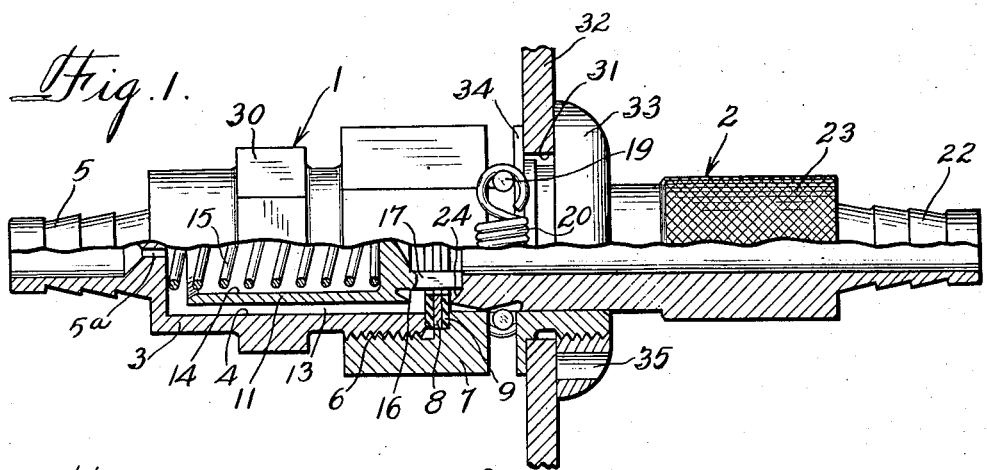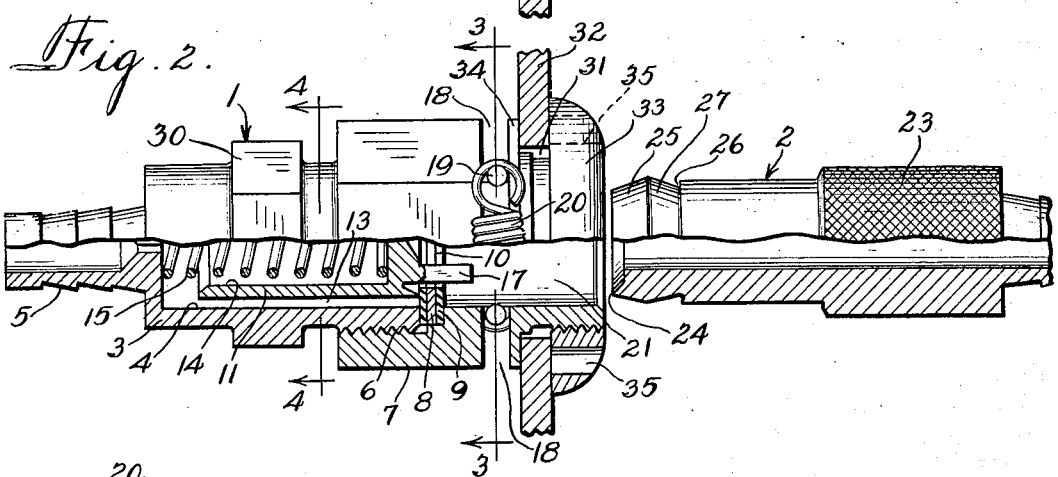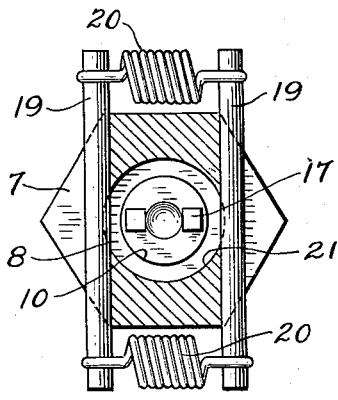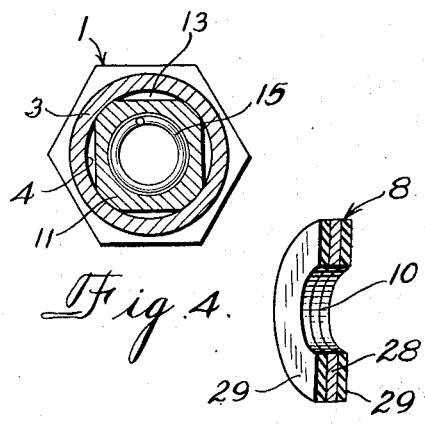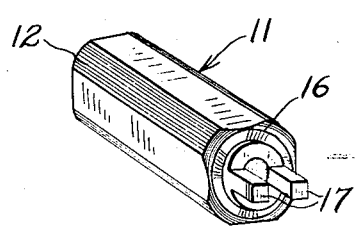

2,320,719

UNITED STATES PATENT OFFICE 2,320,719

VALVED CONNECTOR

Wilfred W. Davies, Chicago, and George A. Page, La Grange, Ill., assignors to United Air Lines Transport Corporation, Chicago, Ill., a corporation of Delaware Application August 29, 1941, Serial No. 408,788

6 Claims. (Cl. 284—14)

This invention relates to valved connectors and more particularly to a valved connector for use with portable extension conduits, each conduit having a mouthpiece or mask on one end and a plug-in device on the other end so that the extension conduits may be used for individual oxygen supply from a suitable container, line and/or manifold. The device is especially adapted for use in airplanes for supplying oxygen to passengers and crew members.

The embodiment of the invention disclosed herein comprises a small receptacle or socket which may be mounted on the wall of the fuselage or on any convenient panel by perforating the panel, mounting the open end of the receptacle in the perforation, and retaining the receptacle in place by means of a threaded escutcheon ring arranged to clamp the panel between the ring and a complementary shoulder on the receptacle. The receptacle may be connected to any suitable oxygen supply by means of a flexible conduit or the like.

The receptacle is provided with an axial bore having a valve seat therein and an elongated valve member normally closing the valve opening by means of a spring tending to force the valve member outwardly against the inner annular surface of the valve seat. The valve is provided with projections extending through the valve seat opening so that the valve member may be pushed rearwardly to open the valve against the compression of the spring.

The portable mouthpiece conduit is provided at one end with a cylindrical plug suitably attached to the flexible conduit and having its free end provided with a valve-closing annular rib for seating against the outer annular surface of the valve seat when the plug is inserted in the receptacle. When the plug is inserted, the end thereof, within the confines of the annular sealing rib, engages the projections on the sliding valve member so that, when the plug is completely inserted, the valve is open and at the same time the annular rib on the plug engages the outer side of the valve seat and seals the connection between the receptacle and the plug.

The free end of the plug is slightly tapered so that it may forcibly be pushed into the receptacle between two transverse locking bars, which bars are resiliently supported in self-adjusting relation in corresponding oppositely disposed transverse slots in the outer wall of the socket. The slots are cut sufficiently deep to intersect the bore of the socket so that the inner sides of the rods are disposed slightly within the receptacle bore. The rods are normally retained in this position by means of tension springs connected therebetween.

An annular groove is provided in the plug closely adjacent the tapered end thereof, and this groove has its forward side tapered in the opposite direction from the tapered end of the plug so that, when the plug is inserted in the receptacle, the two locking rods snap into this annular groove in the plug and the tension of the rods against the angular surface tends to force the end of the plug snugly into contact with the outer surface of the valve seat and thereby seal the connection while at the same time retaining the valve in open position.

It is an object of the invention to provide a valved connector of the type described in which both the valve member and the plug will provide greatly improved sealing characteristics throughout an extended period of use.

A further object is to provide a valved connector of the character described which may easily and quickly be mounted in any desired position in an airplane panel or the like and which will retain its operating efficiency without adjustments of any kind. That is, the device automatically adjusts itself for any normal dislocation of the elements.

A further object is the provision of a valved connector which may be very small and light in weight, preferably made of aluminum or the like, and in which substantially all of the parts may be formed by automatic screw machines or similar machines capable of quantity production; also in which the entire assembly and installation of the device may quickly and easily be accomplished with the use of a minimum number of simple tools.

Another object is to provide a quick acting valved connector of the character described in which all operations directly concerned with valve movement and plug sealing are accomplished with a snap action.

It is also an object to provide a valved connector of the character described which is easy to assemble and install and which is provided with a particularly efficient and serviceable semi-rigid reversible valve seat, which seat may be quickly removed or replaced and which will not easily get out of order.

Further objects will be apparent from the specification and the appended claims.

In the drawing:

Fig. 1 is a side elevation of one embodiment of the invention partially in section in an axial plane and with the plug inserted in the receptacle so that the valve is open and the connection sealed.

Fig. 2 is a view similar to that shown in Fig. 1 but with the plug removed from the receptacle so that the valve is closed.

Fig. 3 is a transverse sectional view of the resilient latching mechanism and is taken on a line substantially corresponding to line 3—3 of Fig. 2 but with the connector turned 90 degrees from the position shown in Figs. 1 and 2.

Fig. 4 is a transverse sectional view through the base of the receptacle and is taken on a line substantially corresponding to line 4—4 of Fig. 2.

Fig. 5 is a perspective view of the movable valve member.

Fig. 6 is a detail perspective view partially in section of the reversible valve seat.

Referring to the drawing in detail, the embodiment illustrated comprises a tubular receptacle 1 and an elongated plug 2 for use in connection with the receptacle. The receptacle comprises a tubular base 3 having an elongated bore 4 therein to receive a movable valve member. The base 3 is provided with the usual grooved nipple extension 5 or any suitable coupling means preferably having a restricted inlet passage 5a communicating with the bore 4. The nipple is adapted to receive thereon a flexible conduit or the like from a suitable oxygen supply. The forward end of the base 3 is externally threaded as shown at 6 to receive an internally threaded valve housing 7. A reversible valve seat 8 in the form of an annular ring or washer is clamped between the end of the base 3 and an internal shoulder 9 in the housing. The valve seat is provided with an enlarged axial aperture 10 and will be described in detail later.

An elongated valve member 11 is slidably mounted in the bore 4 of the valve base. This valve member 11 may be of any suitable polygonal cross section, preferably rectangular, with the corners chamfered as shown at 12 to provide a sliding fit in the bore 4 of the base and to provide a plurality of passages 13 between the valve member and the wall of the base. The valve member 11 is also provided with an elongated bore 14 to receive a compression coil spring 15 normally tending to force the valve member against the valve seat 8. This construction is of considerable importance as it provides for accurate alignment of the valve member with the rigid valve seat, and this alignment is accomplished without materially increasing frictional resistance to movement of the valve member. Perfect sealing of the valve is therefore assured. The end of the valve member 11 is provided with an annular rib 16 which rib is normally pressed into sealed engagement with the inner side of the valve seat 8. The valve member is also provided at its forward end with a pair of outwardly extending projections or lugs 17, which lugs extend outwardly through and beyond the aperture 10 in the valve seat 8. It will be apparent that, with the plug removed as in Fig. 2, the valve will effectively be sealed by the pressure of the annular rib 16 against the valve seat.

The valve housing 7 is provided with a pair of oppositely disposed transverse slots 18, and an elongated rod 19 is loosely supported in each of these slots, the ends of the rods being connected together by means of tension springs 20 as illustrated in detail in Fig. 3. The slots 18 are of sufficient depth to intersect with the bore 21 of the housing 7 so that the inner side of each rod extends slightly within the bore as illustrated.

The plug 2 comprises an elongated cylindrical member having the usual nipple 22 to receive a conduit leading to an oxygen mouthpiece or the like previously referred to. The plug is also provided with a knurled portion 23 to provide an effective finger grip for operating the plug. The forward end of the plug is provided with an annular rib 24 adapted to seat against the front side of the valve seat 8 when the plug is completely inserted in the receptacle.

The forward end of the plug is slightly tapered at 25 so that it may be forced between the resiliently mounted transverse rods 19, and is also provided adjacent the tapered end with an annular groove 26 having a reversely inclined taper 27. The groove 26 is so related to the resiliently mounted rods 19 that, when the plug is completely inserted, the rods rest on the reversely tapered portion 27 to thereby apply a constant load to the plug forcing it inwardly against the sealing assembly so that the rib 24 is held in sealing engagement with the valve seat irrespective of any slight amount of wear of the seat contacts or any other portion of the device. When the plug is inserted in the receptacle to form the sealed connection described, the forward end of the plug, within the annular rib 24, engages the ends of the projecting lugs 17 on the valve member 11. Continued movement of the plug to its sealing position forces the valve member 11 rearwardly against the compression of the spring 15 and thereby opens the valve and simultaneously seals the connection with the plug extension. It will, of course, be understood that, when the plug is removed, the valve member 11 is released and the valve again sealed by the pressure of the spring 15.

The valve seat 8 is easily removable by unscrewing the housing 7 from the base 3. The valve seat is preferably made as shown in detail in Fig. 6 and comprises a substantially rigid metal washer 28 having a thin layer 29 of resilient rubber-like material adhesively or otherwise secured to each side thereof. This type of washer effectively seals the joint between the base 3 and housing 7 when it is clamped therebetween and at the same time provides a resilient seat on each side of the washer for the valve member and plug, respectively.

This substantially rigid valve seat element having suitable sealing material such as rubber or the like on each side is an important feature of the invention in that it provides an effective seal for a plurality of elements and at the same time provides a substantially rigid stop for the plug. It will be understood that the washer 28 may be of any suitable cross sectional or surface contour in accordance with the bonding requirements of the rubber-like material 29.

The housing 7 is preferably formed of hexagonal material and the base is provided with a hexagonal portion 30 so that wrenches may be used if required.

The outer end of the housing 7 is threaded as shown and may extend through an opening 31 in a panel 32. An escutcheon ring 33 is threaded on the housing so that the panel is clamped between the ring and a shoulder 34. The ring may be provided with holes 35 to receive a spanner wrench.

Another important feature of the invention is the push-pull snap operation of the plug caused by the resilient detents. This snap action causes substantially instantaneous opening of the valve and simultaneous sealing of the plug or vice versa.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

Having thus described this invention, what is claimed and desired to be secured by Letters Patent is:

1. In a valved connector, a socket having an axial bore with a normally closed valve therein, said socket having a reduced open end adapted to be secured in the opening of a panel so that a plug may be inserted therein and providing a shoulder for engagement with the back of said panel, means for securing said socket in said panel so that only the open end of said socket is accessible from the front of said panel, oppositely disposed transverse slots through the wall of said socket back of said shoulder and between said shoulder and said valve intersecting said bore, and resilient detents in said slots and extending into said bore, and a conduit plug having an annular portion for automatic cooperation with said detents so that said detents cause an inward and outward snap action of said plug when it is inserted and removed.

2. In a valved connector, a socket having an axial bore with a normally closed valve therein, said socket having a reduced open end adapted to be secured in the opening of a panel so that a plug may be inserted therein and providing a shoulder for engagement with the back of said panel, means for securing said socket in said panel so that only the open end of said socket is accessible from the front of said panel, oppositely disposed transverse slots through the wall of said socket back of said shoulder and between said shoulder and said valve and intersecting said bore, resilient detents in said slots and extending into said bore to yieldably engage the tapered portion of a plug when said plug is inserted therein, a tubular connector plug having an annular V-shaped external shoulder for engagement with said detents so that when said plug is inserted and removed said detents and said V-shaped shoulder cause a snap action of said plug in the respective direction of plug movement, means on said socket and automatically co-operating with said plug to seal the joint therebetween when said plug is snapped completely in said socket, and means co-operating between said plug and said valve to simultaneously open said valve with a snap action.

3. In a valved connector, a socket having an axial bore with a normally closed valve therein, said bore also having a plug sealing seat therein, said socket having a pair of oppositely disposed transverse slots in the outer wall thereof intersecting said bore, detents comprising rods seated in said slots transversely of said bore to partially enter said bore, resilient means connecting the ends of said rods outside said socket to retain said rods in said slots, an extension conduit plug insertable into said socket for sealing engagement with said plug seat, means to simultaneously open said valve during seating of said plug and close said valve during unseating, and an oppositely tapered annular rib on said plug for automatic co-operation with said detent rods so that said plug is seated and unseated with a snap action of said rib past said detents.

4. In a valved connector, a socket having an elongated bore therein, a reversible washer-like valve seat member in said bore and clamped in sealing relation between two portions of said socket to form a restricted passage intermediate the ends of said bore, said valve seat member comprising a rigid metal washer having a layer of compressible material such as rubber or the like adhering to each side thereof to provide oppositely disposed valve seats, a spring-pressed valve having an annular rib normally in sealing engagement with one side of said valve seat member, a tubular push-pull plug terminating in an annular rib for sealing engagement with the opposite side of said seat, means co-operating between said plug and valve to open said valve when said plug is inserted in sealing position, and an automatically operable resilient friction latch on said socket and automatically co-operating with an annular rib on said plug to provide simultaneous opening and closing snap actions of said valve and plug by corresponding insertions or removals of said plug, said latch comprising a pair of oppositely disposed parallel rods seated in transverse slots through the wall of said socket in front of said valve seat and intersecting said bore, and tension springs connecting the ends of said rods.

5. A valved extension connector for oxygen supply in airplanes and the like comprising a panel-supported socket and an extension plug therefor, said socket having a housing with an external thread on one end and an axial bore therethrough, said threaded portion terminating in a shoulder to rest against a panel when said threaded portion is extended through an opening therein, a threaded escutcheon ring on said threaded portion for clamping said panel against said shoulder, oppositely disposed transverse slots immediately back of said shoulder and intersecting said bore, a transversely extending rod in each slot with the sides of said rods extending slightly into said bore, a tension spring connecting the projecting ends of said rods together on each side of said housing so that said rods are resiliently retained in said slots, a shoulder in said bore immediately back of said slots, a tubular base threaded into the inner end of said bore, a substantially rigid washer-like combined valve seat and sealing member clamped in said bore between said base and said shoulder, a valve member slidably mounted in said base, a spring normally holding said valve member in sealing engagement with the inner side of said valve seat, said valve member having a projection extending through the opening in said valve seat, a tubular extension plug for insertion in said socket, said plug having a tapered end for spreading said rods and an annular portion tapered in the opposite direction for yielding engagement behind said rods to yieldably force the end of said plug into sealing engagement with said valve seat, said plug being constructed to engage said valve member projection and retain said valve member in open position when said plug is completely inserted.

6. In a valved connector of the character described a socket having an axial bore therethrough and oppositely disposed valve seats therein intermediate the length of said bore, a spring-pressed valve normally in seating relation with the rear valve seat, said socket having an axial externally threaded front end portion providing a shoulder forwardly of said valve seats to engage the back of a panel, an internal threaded escutcheon ring for said reduced portion to clamp said socket in an opening in a panel, said socket having oppositely disposed transverse slots through the wall thereof closely adjacent said shoulder and between said shoulder and said valve seats and intersecting said bore, an elongated round rod seated in each slot and extending beyond each side of said socket, and tension springs connecting the projecting ends of said rods on each side of said socket.

WILFRED W. DAVIES.
GEORGE A. PAGE.